(12) United States Patent
Zhang et al.

(10) Patent No.: US 9,013,904 B2
(45) Date of Patent: Apr. 21, 2015

(54) SYSTEM AND METHOD FOR DC POWER TRANSMISSION

(75) Inventors: Di Zhang, Albany, NY (US); Luis Jose Garces, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 439 days.

(21) Appl. No.: 13/435,105

(22) Filed: Mar. 30, 2012

(65) Prior Publication Data

US 2013/0258733 A1 Oct. 3, 2013

(51) Int. Cl.
| | |
|---|---|
| H02M 7/00 | (2006.01) |
| H02J 3/36 | (2006.01) |
| H02M 7/493 | (2007.01) |
| H02J 1/02 | (2006.01) |
| H02M 1/00 | (2006.01) |

(52) U.S. Cl.
CPC ............... *H02M 7/493* (2013.01); *H02J 1/02* (2013.01); *H02J 3/36* (2013.01); *H02M 2001/0048* (2013.01); *H02M 2001/0077* (2013.01); *Y02B 70/1491* (2013.01); *Y02E 60/60* (2013.01)

(58) Field of Classification Search
CPC ........... H02M 1/14; H02M 7/493; H02J 5/00; H02J 1/02
USPC ....... 363/34, 37, 125–127, 131, 132
See application file for complete search history.

(56) References Cited

U.S. PATENT DOCUMENTS

| | | | |
|---|---|---|---|
| 4,445,167 A * | 4/1984 | Okado | 363/56.02 |
| 6,075,717 A | 6/2000 | Kumar et al. | |
| 7,760,527 B2 * | 7/2010 | Baudesson et al. | 363/98 |
| 8,102,141 B2 * | 1/2012 | Nagai et al. | 318/766 |
| 2002/0075700 A1 | 6/2002 | Birumachi | |
| 2006/0256587 A1 | 11/2006 | Asplund et al. | |
| 2006/0267542 A1 | 11/2006 | Wei et al. | |
| 2007/0263422 A1 * | 11/2007 | Baudesson et al. | 363/132 |

(Continued)

FOREIGN PATENT DOCUMENTS

| | | |
|---|---|---|
| EP | 0284021 B1 | 12/1994 |
| EP | 0732798 A1 | 9/1996 |
| JP | 3179692 A | 8/1991 |

OTHER PUBLICATIONS

Flourentzou. n. et al.; Abstract : "Optimal SHE-PWM switching patterns for an HVDC system built with eight conventional VSC modules"; IEEE Xplore; This paper appears in: Power Engineering Conference, 2008. AUPEC '08. Australasian Universities; Issue Date : Dec. 14-17, 2008; pp: 1-7.

*Primary Examiner* — Matthew Nguyen
(74) *Attorney, Agent, or Firm* — Ann M. Agosti

(57) ABSTRACT

A power transmission system is provided. The power transmission system includes a power source for providing power. The system also includes a power conversion system comprising power converters coupled to receive the power and convert the power to DC power, wherein the power conversion system comprises a plurality of legs each configured for pulse width modulation. The system further includes a controller comprising an analysis module programmed for determining a number of legs for switching for minimizing a cost function based on operating conditions of the power conversion system. The controller also includes a switch control module programmed for using the number of legs determined by the analysis module for generating switching commands for the power conversion system. The system also includes a DC transmission bus coupled to receive the DC power and transmit the DC power.

20 Claims, 6 Drawing Sheets

(56) References Cited

U.S. PATENT DOCUMENTS

| | | |
|---|---|---|
| 2008/0007978 A1 | 1/2008 | Han |
| 2009/0302682 A1 | 12/2009 | Hammond et al. |
| 2011/0164443 A1* | 7/2011 | Chen et al. .................... 363/132 |
| 2012/0106221 A1* | 5/2012 | Ochi et al. .................... 363/132 |

* cited by examiner

SYSTEM AND METHOD FOR DC POWER TRANSMISSION

BACKGROUND

The invention relates generally to electrical power transmission systems and, more particularly, to systems and methods for transmitting DC power in electrical power transmission systems.

There is a growing need to deliver power from onshore or offshore platforms to subsea electrical equipment operating at seabed or remote offshore locations. However, transmission of the electrical power to the sub-sea electrical equipment often requires high voltage power to be transmitted over long distances.

Alternating current (AC) transmission systems are considered inefficient for transmitting high voltage power over long distances as capacitance in AC transmission cable reduces the load carrying capability of the AC cable. In contrast, high voltage direct current (HVDC) transmission provides a more efficient way to transmit high voltage power over long distances. However, strict limitations on amplitude of harmonic currents flowing in the HVDC transmission cable have to be maintained.

In one conventional approach for keeping the amplitude of the harmonic current within required limits in an HVDC transmission, pulse width modulation (PWM) converters are used to control the harmonic current. The inventors of the present invention have found that conventional switching methods of PWM converters in HVDC embodiments lead to excessive switching losses and herein present embodiments wherein such switching losses are reduced.

BRIEF DESCRIPTION

Briefly, in accordance with one embodiment, a power transmission system is provided. The power transmission system includes a power source for providing power. The system also includes a power conversion system comprising power converters coupled to receive the power and convert the power to DC power, the power conversion system comprises a plurality of legs each configured for pulse width modulation. The system further includes a controller comprising an analysis module programmed for determining a number of legs for switching for minimizing a cost function based on operating conditions of the power conversion system. The controller also includes a switch control module programmed for using the number of legs determined by the analysis module for generating switching commands for the power conversion system. The system also includes a DC transmission bus coupled to receive the DC power and transmit the DC power.

In another embodiment a DC power transmission system is provided. The system includes an AC power source for providing AC power. The system also includes a power conversion system that includes an AC-DC power converter coupled to receive the AC power and convert the AC power to DC power and a DC-DC power converter coupled to the AC-DC power conversion system and configured to convert DC power received from the AC-DC converter to a pulse width modulated DC power. The DC-DC power converter comprises a plurality of legs, each configured for pulse width modulation. The power conversion system further includes a controller coupled to the DC-DC power converter comprising an analysis module programmed for determining a number of legs for switching for minimizing a cost function based on operating conditions of the power conversion system. The controller also includes a switch control module programmed for using the number of legs determined by the analysis module for generating switching commands for the power conversion system. The DC power transmission system further includes a DC transmission bus coupled to the DC-DC power conversion system and configured to receive and transmit the pulse width modulated DC power subsea.

In yet another embodiment, a method for DC power transmission is provided. The method includes obtaining AC power from an AC power source. The method also includes converting the AC power to DC power. The method further includes converting the DC power to a pulse width modulated (PWM) DC power by determining a number of legs for switching for minimizing a cost function based on operating conditions of the power conversion system and using the number of legs determined by the analysis module for generating switching commands for the power conversion system. The method also includes transmitting the pulse width modulated DC power over a DC transmission bus.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include a power transmission system configured to transmit DC power. The DC transmission system comprises a power source (which may be AC or DC) for providing power to a power conversion system that converts the power to DC power. The power conversion system includes power converters that include a plurality of legs, and each of the legs is configured for pulse width modulation. In one embodiment, the power conversions system includes an AC-DC power converter and a DC-DC power converter coupled to each other. In a specific embodiment, the DC-DC power converter is coupled to a controller. The controller includes an analysis module programmed for determining a number of legs for switching for minimizing a cost function based on operating conditions of the power conversion system. This is in contrast to conventional control techniques which automatically send switching signals to the same number of legs regardless of the operating conditions. The analysis module transmits the number of legs to the switch control module that is programmed for using the number of legs determined by the analysis module for generating switching commands for the power conversion system. The DC power is further transmitted to receiver over a DC transmission bus.

Figure 1:
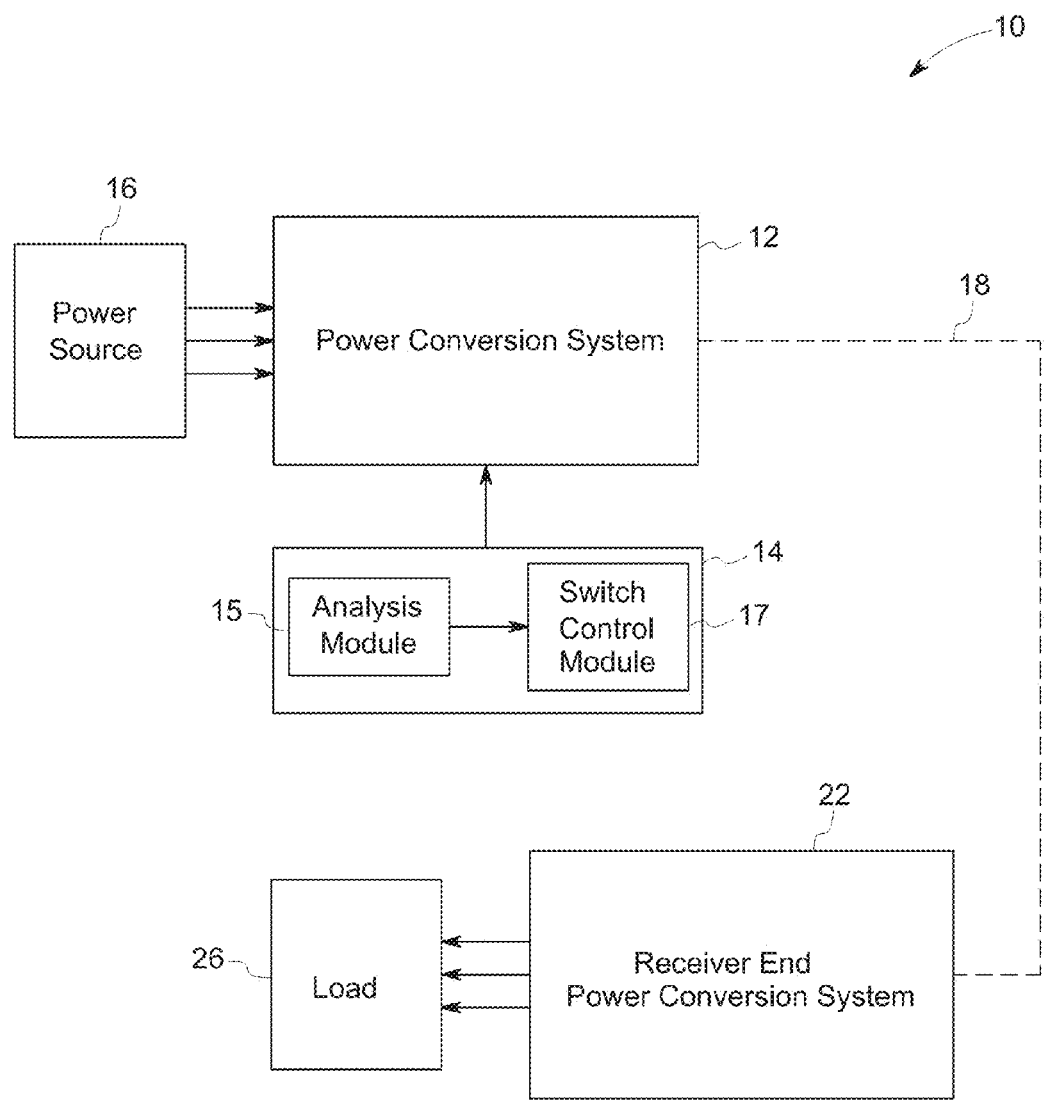
FIG. 1 is a block diagram representation of a DC transmission system including a power conversion system coupled to a controller comprising an analytical module and a switch module in accordance with an embodiment of the invention.

FIG. 1 is a block diagram representation of a power transmission system 10 including a power conversion system 12 coupled to a controller 14 for switching legs in the power conversion system 12 in accordance with an embodiment of the invention. The power transmission system 10 includes a power source 16 that transmits power to the power conversion system 12. In one embodiment, the power source 16 includes an AC or a DC power source. In an embodiment wherein the power source comprises an AC power source, the power conversion system 12 includes an AC-DC power converter coupled to a DC-DC power converter (shown in FIG. 2). In an embodiment wherein the power source comprises a DC power source, the power conversion system 12 includes DC-DC power converters. In either embodiment, each of the DC-DC power converters includes a plurality of legs that are configured for pulse width modulation. The power conversion system 12 is coupled to the controller 14 that controls the plurality of legs by generating switching commands.

The controller 14 includes an analysis module 15 programmed for determining a number of legs for switching for minimizing a cost function based on operating conditions of the power conversion system 12. In one embodiment, the operating conditions may include output current, output voltage, number of power modules connected and active, power conversion system characteristics. In a more specific embodiment, as discussed below, the cost function is minimized for a given load condition when the fewest legs are being switched while current ripple amplitudes of the converters are maintained within predetermined acceptable thresholds.

The analysis module 15 transmits the number of legs to a switch control module 17 that is programmed for using the number of legs determined by the analysis module 15 for generating switching commands for the power conversion system 12. In one embodiment, the exact number of legs is used when the controller sends the switching signals. In another embodiment, the number of legs from the analysis module is a minimum number of legs that may be switched according to commands from the switch control module. The legs being switched convert the power received from the power source 16 to pulse width modulated DC power that is transmitted over the DC transmission bus 18. DC transmission bus 18 couples power conversion system 12 to a receiver end power conversion system 22 that converts the pulse width modulated DC power to a power that can be used by a load 26. In one embodiment, the power transmission system 10 comprises a subsea DC power transmission system.

Figure 2:
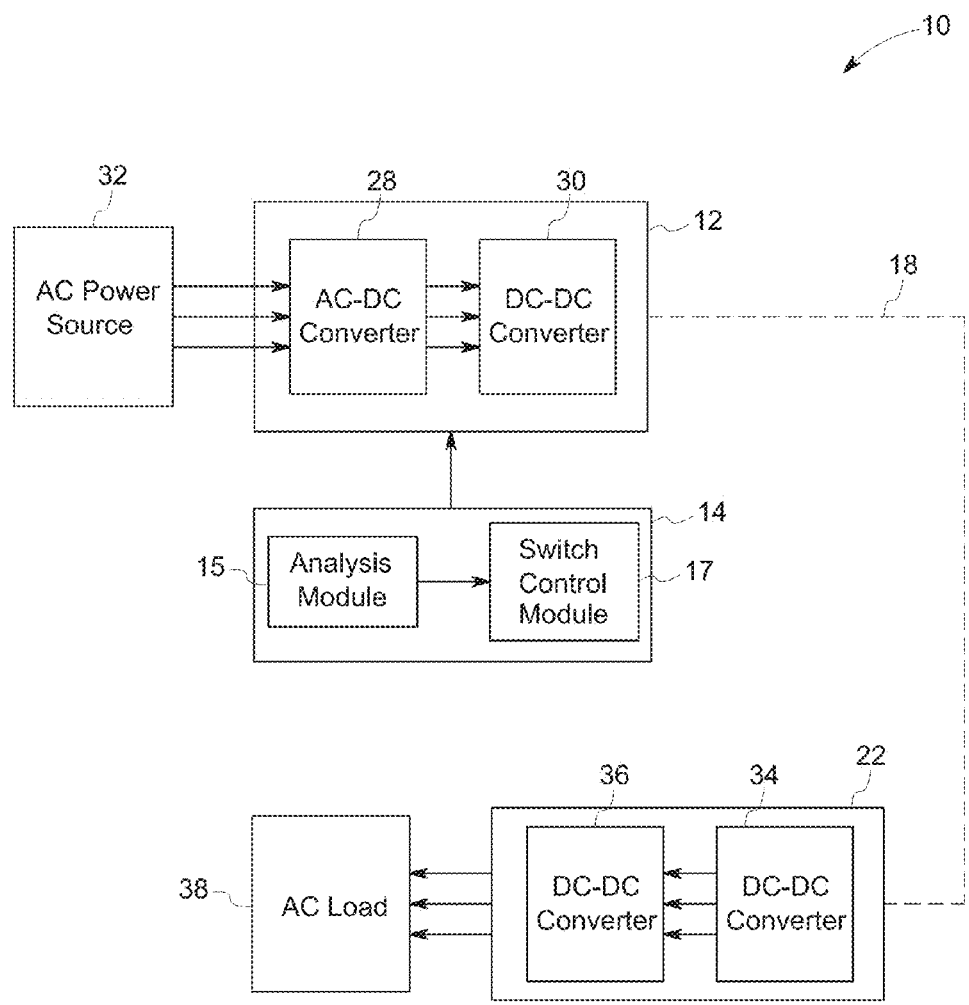
FIG. 2 is a block diagram representation of an exemplary DC transmission system including an AC-DC converter and a DC-DC converter coupled to a controller comprising an analytical module and a switch module in accordance with an embodiment of the invention.

FIG. 2 is a block diagram representation of an exemplary embodiment of a power transmission system 10 including the power conversion system 12 comprising an AC-DC converter 28 and a DC-DC converter 30 coupled to the controller 14 in accordance with an embodiment of the invention. The power transmission system 10 includes an AC power source 32 that is coupled to the power conversion system 12. The power conversion system 12 includes the AC-DC power converter 28 coupled to the AC power source 32. The AC-DC power converter 28 receives AC power from the AC power source 32 and converts the AC power to DC power. The power conversion system 12 further includes the DC-DC power converter 30 that is coupled to the AC-DC power converter 28, receives the DC power from the AC-DC power converter 28, and converts the DC power to a pulse width modulated DC power. The DC-DC power converter 30 includes a plurality of legs that are configured for pulse width modulation of the DC power. The DC-DC power converter 30 is coupled to the controller 14 that controls the switching of the plurality of legs of the DC-DC power converter 30. The controller 14 generates switching commands from the switch control module 17 based on the number of legs determined by the analysis module 15 for switching the number of legs of the DC-DC power converter 30 during pulse width modulation of the DC power per duty cycle. The DC-DC power converter 30 transmits the pulse width modulated DC power over the DC transmission bus 18 to a receiver end power conversion system 22. In one embodiment, the power transmission system 10 includes a subsea DC power transmission system such that at least a portion of the transmission bus is situated under the ocean.

In one embodiment, when the intended load is an AC load, the receiver end power conversion system 22 includes a receiver end DC-DC power converter 34 and a receiver end DC-AC power converter 36. The receiver end DC-DC power converter 34 converts the pulse width modulated DC power to voltage source DC power. The DC power is transmitted to the receiver end DC-AC power converter 36 that converts the DC power to AC power that is used by an AC load 38 for operation.

Figure 3:
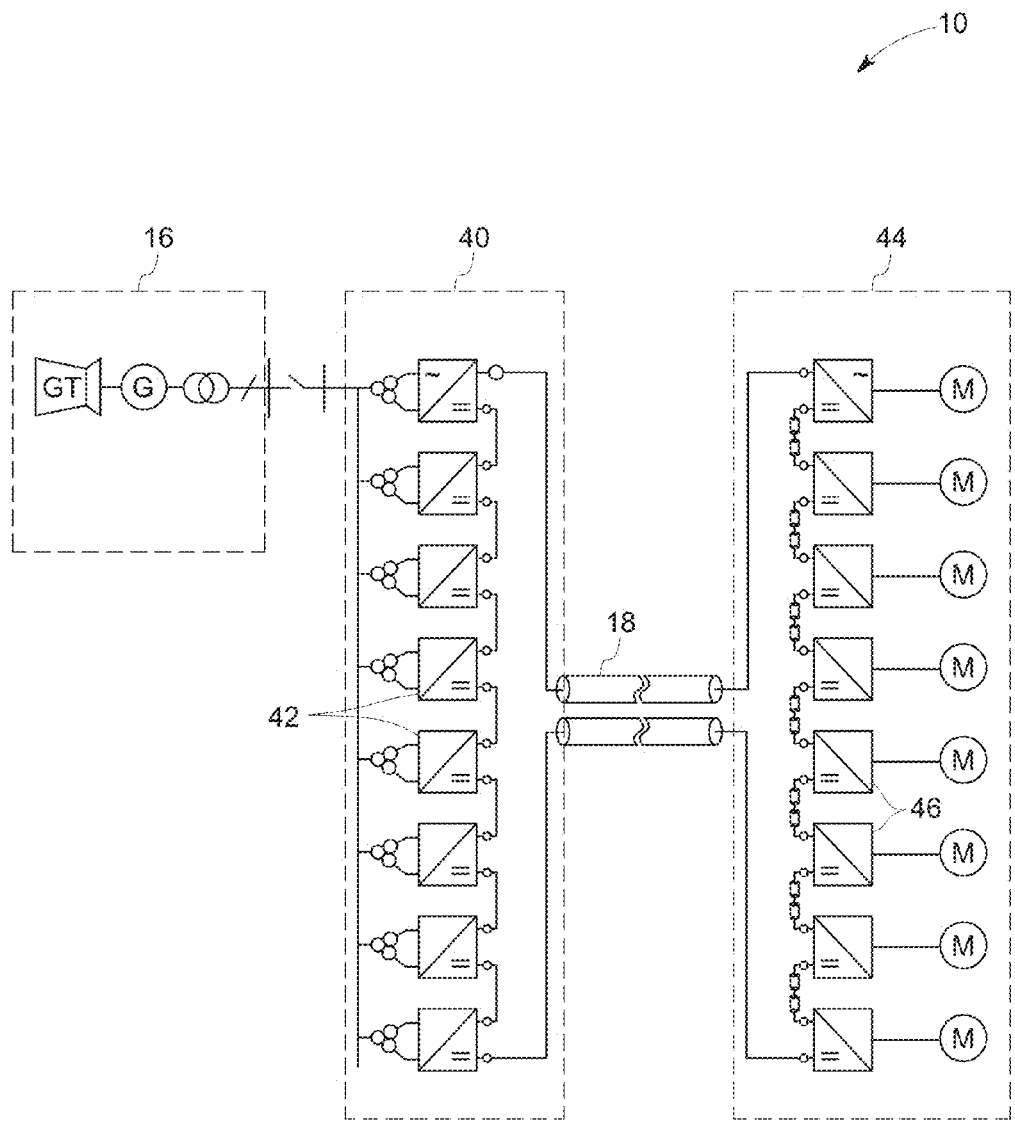
FIG. 3 is a schematic representation of a power transmission system including a modular stacked power conversion system comprising a plurality of modules wherein each of the modules includes a power conversion system coupled to a controller comprising an analytical module and a switch module in accordance with an embodiment of the invention.

FIG. 3 is a schematic representation of the power transmission system 10 including a modular stacked power conversion system 40 comprising a plurality of modules 42 coupled to an AC power source 16. In one embodiment, each of the modules 42 includes an AC-DC power converter 28 (FIG. 2) coupled to the DC-DC power converter 30 (FIG. 2). In another embodiment wherein a DC power source is used, the AC-DC power converters are not required. Each of the modules 42 is coupled to the controller 14 (FIG. 2) that generates switching commands from the switch control module 17 based on the number of legs determined by the analysis module 15 for its respective DC-DC power converter 30. Similarly, the receiver end power conversion system 22 may include the modular stacked power conversion system 44 and each of the power conversion modules 46 in the receiver end power conversion system 22 includes the receiver end DC-DC power converter 34 (FIG. 2) and, for AC loads, the DC-AC power converter 36 (FIG. 2).

Figure 4:
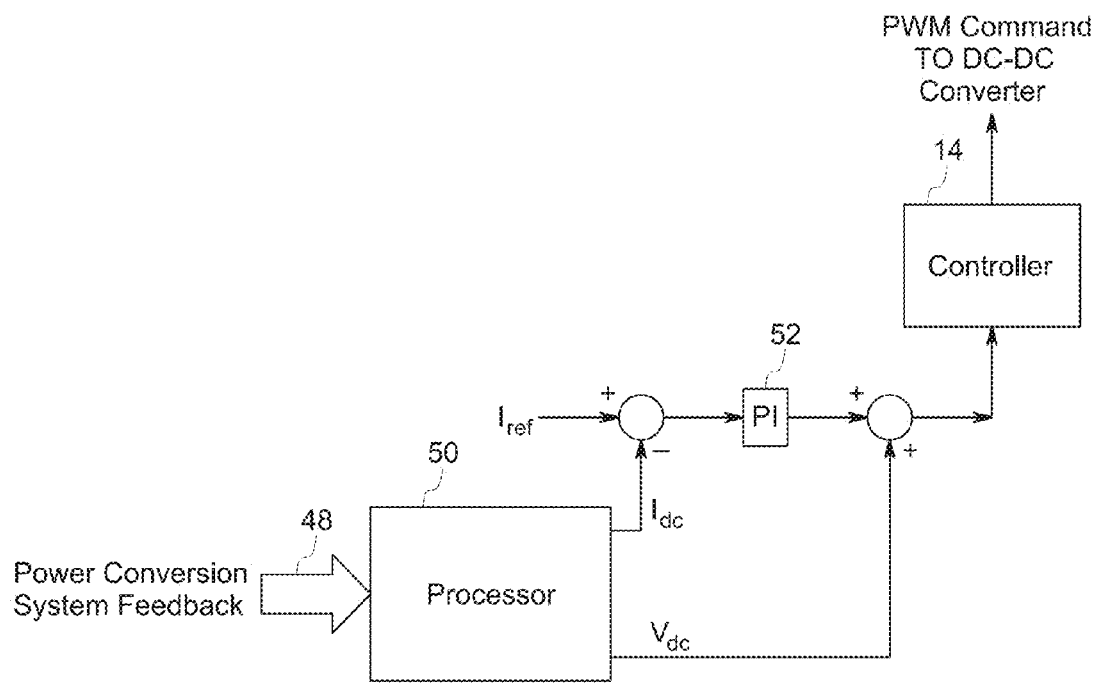
FIG. 4 is a control diagram representation of operations of a controller coupled to a power conversion system comprising an analytical module and a switch module in accordance with an embodiment of the invention.

FIG. 4 is a control diagram representation of operations of the controller 14 coupled to the power conversion system 12 in accordance with an embodiment of the invention. The power conversion system 12 is coupled to the controller 14 via a feedback loop in which sensors (not shown) provide signals 48 representing the DC power transmitted over the DC transmission bus 18 to a processor 50. The processor 50 which may be embedded in or separate from the controller 14 computes a value of an actual current (Idc) flowing in the DC transmission bus 18 and a voltage (Vdc) at output of the power conversion system 12. The processor 50 transmits the value of the actual current (Idc) to a proportional integral regulator (52, PI). The proportional integral regulator (52, PI)

also receives a constant reference current (Iref) from the controller 14. The proportional integral regulator (52, PI) generates a signal to adjust the output voltage value based on a difference between the constant reference current (Iref) and the actual current (Idc). To improve system dynamic performance, the controller 14 uses the output of the proportional integral regulator along with the measured system output voltage (Vdc) at the output of the power conversion system 12 to generate the switching commands for pulse width modulation of the DC power.

Figure 5:
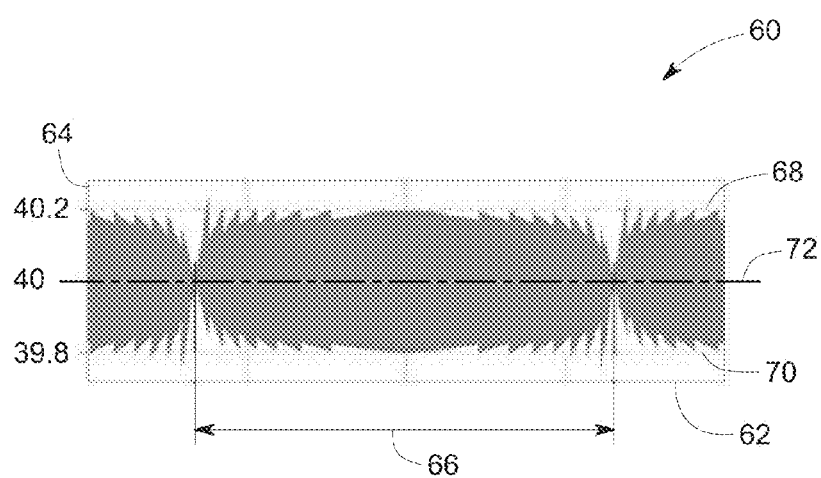
FIG. 5 is a graph representing results of an exemplary simulation conducted by switching a number of legs of the power conversion system with the variation of output voltage based on pulse width modulation in accordance with an embodiment of the invention.

FIG. 5 is an exemplary graph 60 representing a DC current 62 generated after switching some of the legs the power conversion system 12 based on pulse width modulation in accordance with an embodiment of the invention. The X axis represented by 62 depicts the system output voltage and the Y axis represented by 64 depicts the current (I) in amperes. As shown, the portion 66 depicts the ripple current (Iripple) variation cycle according to the output voltage. Switching of the DC power results in ripple current (Iripple) in the output DC current (Idc). The amplitude of the ripple current (Iripple) is required to be controlled within predefined limits that may be determined by the current carrying capacity of the DC transmission bus, for example. In an exemplary approach, an upper limit of desired current ripple is represented by reference numeral 68, a lower limit of desired current ripple is represented by reference numeral 70 and a normal level is represented by reference numeral 72. In one embodiment, switching the legs includes switching the legs based on symmetric interleaving In operation for all practical purposes, the amplitude of the ripple current (Iripple) is dependent on the real time operating conditions of the DC transmission system (FIG. 1). For a system using power modules with three level converters the output voltage can be represented by the duty cycle (D), which is the fractional part of the ratio between the output voltage of the power conversion system and is half of the a DC bus voltage of one power module 40. The amplitude of the ripple current (Iripple) is inherently lower when the duty cycle (D) is 0 or 1 and is higher when the duty cycle (D) is half (0.5). Therefore, the number of legs that are switched in the power conversion system can be less when the duty cycle is close to 0 or 1 which reduces the switching losses and increases efficiency of the system. The number of legs needed for switching the DC power and maintaining the current ripple amplitude are determined by the analyst module and can be determined based on the following expressions.

The maximum current ripple amplitude (Iripplemax) can be expressed as $$Iripplemax = UTs/4N_{max}L, \quad (1)$$

wherein U represents a value of half of the dc bus voltage in one power conversion module, Ts is the switching cycle, N max is the maximum number of legs switched, and L is the total inductance of output inductors.

The number of switched legs to maintain an acceptable current ripple amplitude can be represented as Nsw and the ripple current (Iripple) amplitude can be represented as $$Iripple = (1-D)DX(UTs/N_{sw}L) \quad (2)$$

wherein D is the duty cycle. In order for ripple current amplitude to be within limits Iripple≤Iripplemax, therefore, $$D \leq 0.5 - 0.5\sqrt{1 - \frac{N_{sw}}{N_{max}}} \quad \text{or} \quad (3)$$

$$D \geq 0.5 + 0.5\sqrt{1 - \frac{N_{sw}}{N_{max}}}. \quad (4)$$

Based on equation (3) and equation (4), the reduced number of switching legs (some legs from the number of legs) of the power conversion system and the range of duty cycle (D) can be calculated that will still keep the current ripple amplitude within limits.

In one exemplary situation, assuming that duty cycle (D) is evenly distributed between 0 and 1 and N legs are switched, the range of D can be represented as $$0.5 - 0.5\sqrt{1 - \frac{N-1}{N_{max}}} \leq D \leq 0.5 - 0.5\sqrt{1 - \frac{N}{N_{max}}} \quad (5)$$

As a result, the possibility of using N switched legs is $$P(N) = \sqrt{1 - \frac{N-1}{N_{max}}} - \sqrt{1 - \frac{N}{N_{max}}} \quad (6)$$

Therefore, the equivalent switching times in each switching cycle can be expressed as $$N_{eq} = \sum_{k=1}^{N_{roas}} kP(k) \quad (7)$$

The above analysis is demonstrated with the assumption that the system is using three level converters. But the method can be extended to other system using legs with different voltage levels.

Figure 6:
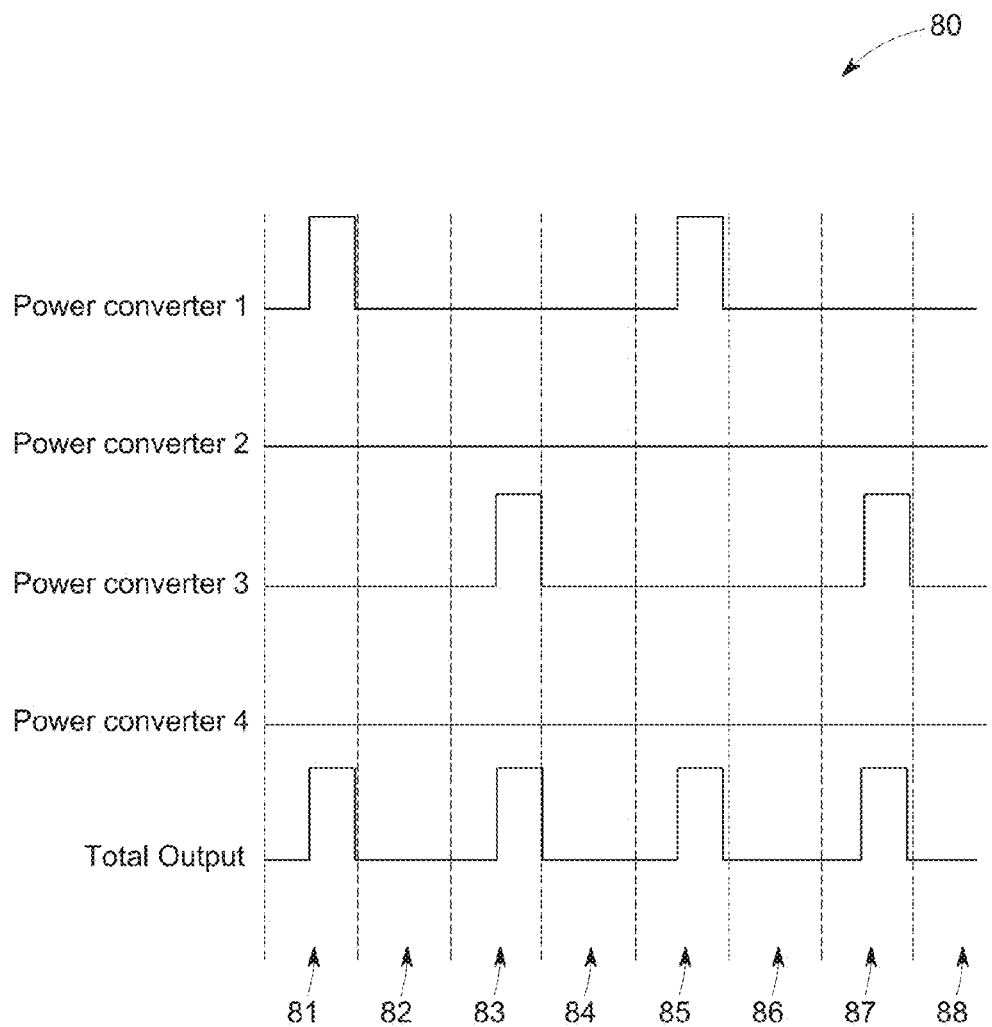
FIG. 6 is a controller timing diagram representing switching of a number of legs of the power conversion system in accordance with an embodiment of the invention.

FIG. 6 is a controller timing diagram 80 representing switching of legs of the power conversion system in accordance with embodiment of the invention. Assuming that there are four power converters and each power converter includes two legs, the total number of legs is eight. In operation, one duty cycle can be divided into eight parts (81, 82, 83, 84, 85, 86, 87, 88). In the first part 81, the first leg of the first power converter switches the DC power. In the second part 82, none of the legs switch DC power. In the third part 83, the first leg of the third power converter switches DC power. In the fourth part 84, none of the legs switch DC power. In fifth part 85, the second leg of the first power converter switches DC power. In the sixth part 86, none of the legs switch power. In the seventh part 87, the second leg of the third power converter switches DC power. In the eight part 88, none of the legs switch power. The resulting output of the power conversion system is a pulse width modulated DC power with ripple current amplitude within limits as shown in FIG. 5 with reduced switching losses.

Figure 7:
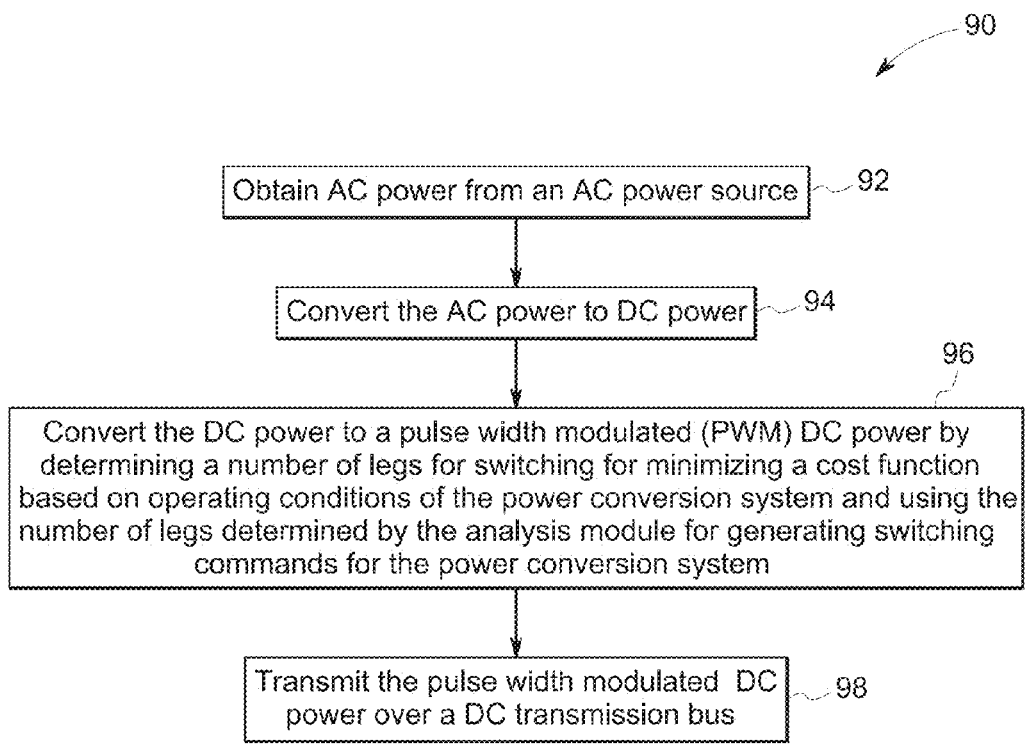
FIG. 7 is a flow chart representing steps involved in a method for DC power transmission including switching a number of legs of the power conversion system in accordance with an embodiment of the invention.

FIG. 7 is a flow chart representing steps involved in a method 90 for DC power transmission including switching of legs of the power conversion system in accordance with an embodiment of the invention. The method 90 includes obtaining AC power from an AC power source in step 92. The method 90 also includes converting the AC power to DC power in step 94. The method 90 further includes converting the DC power to a pulse width modulated (PWM) DC power by determining a number of legs for switching for minimizing a cost function based on operating conditions of the power conversion system and using the number of legs determined by the analysis module for generating switching commands for the power conversion system in step 96. In a specific embodiment, minimizing the cost function comprises minimizing switching losses. In one embodiment, switching of the legs comprises switching the minimum number of legs needed to maintain amplitude of the current ripple equal or within predefined limits of the DC transmission bus. In a more specific embodiment, switching of the legs comprises switching the legs based on symmetrical interleaving. The method 90 also includes transmitting the pulse width modulated DC power over a DC transmission bus in step 98. In one embodiment, transmitting the variable DC power over the DC transmission bus comprises transmitting the pulse width modulated DC power at subsea levels It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power transmission system comprising:
a power source for providing power;
a power conversion system comprising power converters for receiving the power and converting the power to pulse width modulated (PWM) DC power, wherein the power conversion system comprises a plurality of legs each configured for pulse width modulation;
a controller comprising:
an analysis module programmed for determining a number of legs for switching for minimizing a cost function based on operating conditions of the power conversion system;
a switch control module programmed for using the number of legs determined by the analysis module for generating switching commands for the power conversion system; and
a DC transmission bus coupled to receive and transmit the DC power.

2. The system of claim 1, wherein the cost function comprises current ripple and switching losses.

3. The system of claim 1, wherein the analysis module determines a minimum number of legs needed to be switched to ensure that an amplitude of a current ripple does not exceed predefined limits of the DC transmission bus.

4. The system of claim 1, wherein the power converters comprises DC-DC power converters.

5. The system of claim 1, wherein the power source comprises a DC power source.

6. The system of claim 1, wherein the power source comprises an AC power source and wherein the power conversion system further comprises an AC-DC power converter coupling the AC power source to the DC-DC power converter.

7. The system of claim 1, wherein the power conversion system comprises a modular stacked power conversion system comprising a plurality of power conversion modules.

8. The system of claim 7, wherein each of the power conversion modules comprises an AC-DC power converter and a DC-DC power converter.

9. The system of claim 1, wherein the switching commands are based on symmetric interleaving.

10. The system of claim 1, wherein the power transmission system comprises a subsea DC transmission system.

11. A DC power transmission system comprising;
an AC power source for providing AC power;
a power conversion system comprising:
an AC-DC converter coupled to receive the AC power and convert the AC power to DC power, and
DC-DC converters for converting the DC power from the AC-DC converter to a pulse width modulated DC power, wherein the DC-DC power conversion system comprises a plurality of legs, each configured for pulse width modulation;
a controller coupled to each of the DC-DC converter comprising:
an analysis module programmed for determining a number of legs for switching for minimizing a cost function based on operating conditions of the power conversion system;
a switch control module programmed for using the number of legs determined by the analysis module for generating switching commands for the power conversion system; and
a DC transmission bus coupled to the DC-DC converters and configured to receive and transmit the pulse width modulated DC power subsea.

12. The system of claim 11, wherein the cost function comprises current ripple and switching losses.

13. The system of claim 11, wherein the analysis module determines a minimum number of legs needed to be switched to ensure that amplitude of a current ripple does not exceed predefined limits of the DC transmission bus.

14. The system of claim 11, wherein the power conversion system comprises a modular stacked power conversion system.

15. The system of claim 14, wherein each of the power conversion modules comprises an AC-DC converter and a DC-DC converter.

16. The system of claim 12, wherein the switching commands are based on symmetric interleaving.

17. A method for DC power transmission comprising:
obtaining AC power from an AC power source;
converting the AC power to DC power;
converting the DC power to a pulse width modulated (PWM) DC power by using an analysis module for determining a number of legs for switching for minimizing a cost function based on operating conditions of the power conversion system and using the number of legs determined by the analysis module for generating switching commands for the power conversion system; and
transmitting the pulse width modulated DC power over a DC transmission bus.

18. The method of claim 17, wherein minimizing the cost function comprises minimizing switching losses.

19. The method of claim 17, wherein determining the number of legs comprises determining a minimum number of legs needed to be switched to ensure that an amplitude of a current ripple does not exceed predefined limits of the DC transmission bus.

20. The method of claim 17, wherein the switching commands are based on symmetrical interleaving.

* * * * *

UNITED STATES PATENT AND TRADEMARK OFFICE
CERTIFICATE OF CORRECTION

| | | |
|---|---|---|
| PATENT NO. | : 9,013,904 B2 | Page 1 of 1 |
| APPLICATION NO. | : 13/435105 | |
| DATED | : April 21, 2015 | |
| INVENTOR(S) | : Zhang et al. | |

It is certified that error appears in the above-identified patent and that said Letters Patent is hereby corrected as shown below:

IN THE SPECIFICATION

COL. 1, LINE 3

Before the BACKGROUND, insert

--STATEMENT REGARDING FEDERALLY SPONSORED RESEARCH & DEVELOPMENT

This invention was made with Government support under contract number DE-AC26-07NT42677 awarded by the United States Department of Energy. The Government has certain rights in the invention.--

Signed and Sealed this
Sixth Day of October, 2015

Michelle K. Lee
*Director of the United States Patent and Trademark Office*

UNITED STATES PATENT AND TRADEMARK OFFICE
CERTIFICATE OF CORRECTION

PATENT NO. : 9,013,904 B2  Page 1 of 1
APPLICATION NO. : 13/435105
DATED : April 21, 2015
INVENTOR(S) : Zhang et al.

It is certified that error appears in the above-identified patent and that said Letters Patent is hereby corrected as shown below:

On the Title Page, Figure, in the box "36", delete "DC-DC" and insert -- DC-AC --, therefor.

In the drawings

In Fig. 2, Sheet 2 of 6, in the box "36", delete "DC-DC" and insert -- DC-AC --, therefor.

In the specification

In Column 1, Line 41, delete "power," and insert -- power, wherein --, therefor.

In Column 6, Line 32-33, in Equation (7), delete " $\sum_{k=1}^{N_{max}} kP(k)$ " and insert -- $\sum_{k=1}^{N_{max}} kP(k)$ --, therefor.

In the claims

In Column 8, Line 8, in Claim 11, delete "comprising;" and insert -- comprising: --, therefor.

Signed and Sealed this
Fifteenth Day of December, 2015

Michelle K. Lee
*Director of the United States Patent and Trademark Office*